(12) United States Patent
Jancic

(10) Patent No.: US 8,074,395 B2
(45) Date of Patent: Dec. 13, 2011

(54) DEVICE FOR CATCHING INSECTS, SPIDERS AND OTHER SUCH SMALL ANIMALS

(76) Inventor: Silvin M. Jancic, Villmergen (CH)

( * ) Notice: Subject to any disclaimer, the term of this patent is extended or adjusted under 35 U.S.C. 154(b) by 420 days.

(21) Appl. No.: 12/303,478

(22) PCT Filed: May 24, 2007

(86) PCT No.: PCT/CH2007/000263
§ 371 (c)(1),
(2), (4) Date: Dec. 4, 2008

(87) PCT Pub. No.: WO2007/140636
PCT Pub. Date: Dec. 13, 2007

(65) Prior Publication Data
US 2009/0313884 A1    Dec. 24, 2009

(30) Foreign Application Priority Data
Jun. 8, 2006 (CH) .......................... 927/06

(51) Int. Cl.
*A01M 1/06* (2006.01)
*A01M 5/02* (2006.01)
(52) U.S. Cl. ................. 43/139; 43/110; 43/133; 15/344
(58) Field of Classification Search ................ 43/1, 107, 43/110, 11, 124, 132.1, 133–135, 139, 140; D22/122; 15/300.1, 330, 344, 345; 604/313–316
See application file for complete search history.

(56) References Cited

U.S. PATENT DOCUMENTS

| 1,141,039 | A | * | 5/1915 | Cox | 43/139 |
| 3,965,608 | A | * | 6/1976 | Schuman | 43/110 |
| 4,733,495 | A |   | 3/1988 | Winnicki | |
| 5,367,821 | A |   | 11/1994 | Ott | |
| 7,014,622 | B1 | * | 3/2006 | Pressly et al. | 604/110 |
| 2005/0246945 | A1 | * | 11/2005 | Evink | 43/139 |

FOREIGN PATENT DOCUMENTS

| DE | 32 25 330 A1 | | 1/1984 |
| DE | 91 16 394.3 | | 10/1992 |
| DE | 4327150 A1 | * | 2/1995 |
| GB | 4737 | | 6/1912 |
| JP | 2003092963 A | * | 4/2003 |

* cited by examiner

*Primary Examiner* — David Parsley
*Assistant Examiner* — Danielle Clerkley
(74) *Attorney, Agent, or Firm* — Henry M. Feiereisen; Ursula B. Day

(57) ABSTRACT

A suction device for catching, for example, insects includes a piston arranged for axial movement in the axial direction inside a housing having a suction tube, and a spring attached between the piston and the suction tube. A locking member releasably locks with a latching member when the suction tube is moved in the axial direction against the piston. A trigger is actuated from outside the housing to release the latching member of the piston from the locking member of the suction tube. A spring force from the spring then causes the piston to move away from the suction tube toward the rear wall of the housing, producing a vacuum inside the housing which draws in the insects, spiders and other small animals.

11 Claims, 3 Drawing Sheets

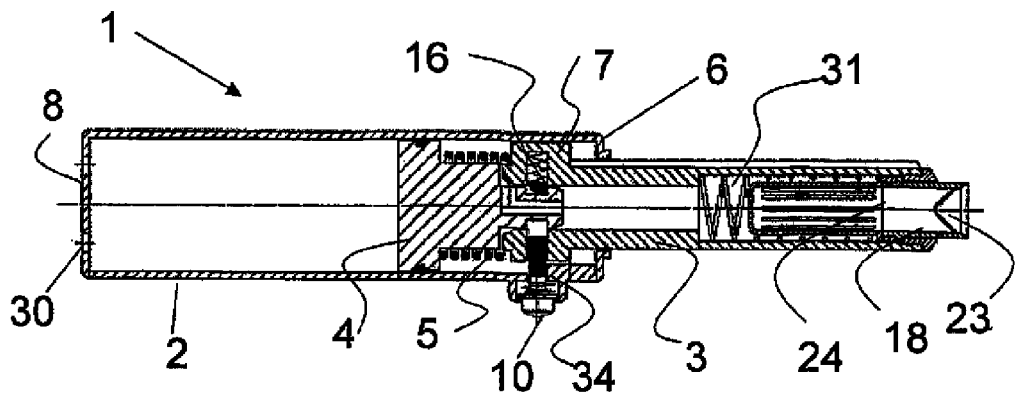
Fig. 4
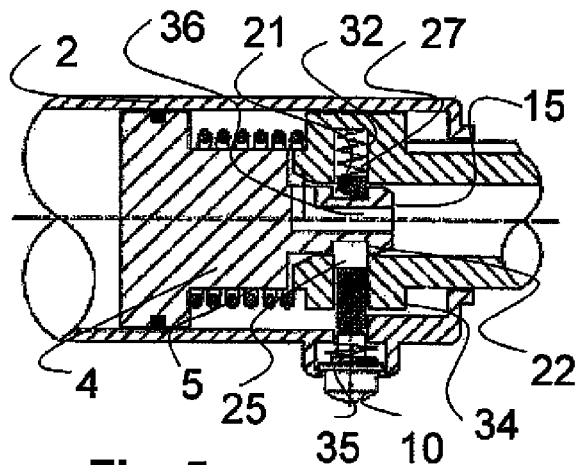
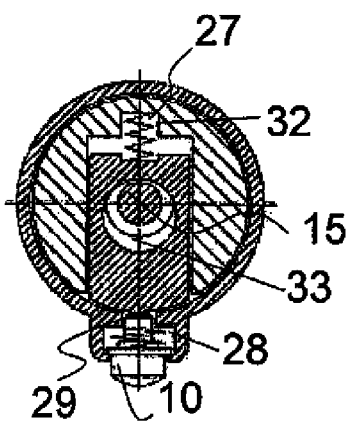
Fig. 5a　　　　　　Fig. 5b
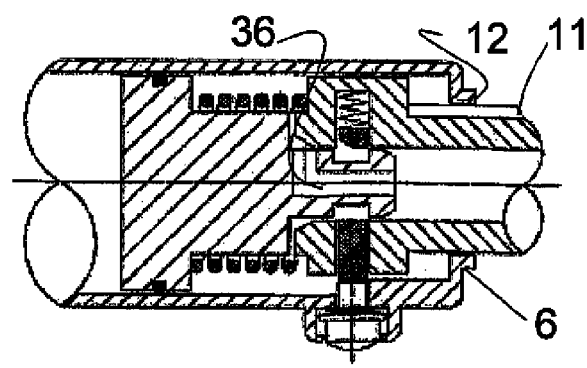
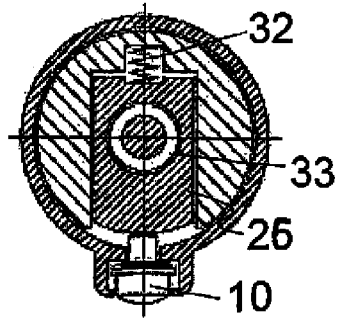
Fig. 6a　　　　　　Fig. 6b

DEVICE FOR CATCHING INSECTS, SPIDERS AND OTHER SUCH SMALL ANIMALS

BACKGROUND OF THE INVENTION

The invention relates to a device for catching insects, spiders and other such small animals.

Known methods for removing insects and spiders from the environment of human beings are, e.g., the fly flap and the lime twig. These are, however, questionable instruments for removing insects from a hygienic standpoint. Spray cans and powders with, e.g., insecticides especially for flying and creeping insects are commercially available. This is an environmentally harmful but common killing method. When improperly and frequently applied in inhabited spaces, insecticides present even for human beings a health risk which is not to be neglected. According to another current method, lured-in flying insects are killed with special devices by means of electric current. Also known are small electrically operated table vacuum cleaners that can also be used for sucking in insects and spiders. A regular vacuum cleaner can also be used, but this is time-consuming, cumbersome and often times questionable, since vacuuming off of, e.g., food, with a vacuum cleaner is very unhygienic.

Another solution are devices with a pulsating suction unit and a suction nozzle connected thereto. This is based on the knowledge that one can almost always approach, e.g., a fly with the finger up to about 1 cm before it flies away. A suction nozzle that is required for sucking-in a fly has approximately the cross sectional dimensions of a finger or thumb, and only a short pulse-like suction burst needs to be applied in order to suck in the object from short distance.

A device of this kind is known from DE 3225330A1. In this known device, a catch piece that can be unscrewed is arranged anteriorly of a hollow cylinder in which a piston and a tension element are arranged. The catch space for the insects is located inside the catch piece. On the inlet-side, the catch space is completed by a one-way valve that acts as a blocking element. On the outlet side, the catch space is completed by a perforated basket. The helical spring that forms the tension element is arranged between the front side of the piston and the front end of the hollow cylinder and stores its energy by axial squeezing. A pressure stamp that acts on the rear side of the piston and is provided as tension member is attached at the bottom of the pot-shaped tension chuck and guided outside on the hollow cylinder. In this known device, a catch space is required upstream of the hollow cylinder and sealed against the hollow cylinder by a perforated basket. The piston, which is operated by the helical spring and guided in the hollow cylinder merely at the cylindrical piston surface, can tilt relatively easily and thereby interfere the suction process.

G 91 16 394.3 discloses a further developed pulsating suction unit, in which the spring-elastic tension elements are arranged between the rear side of the piston and the bottom part of the hollow cylinder. On its rear side, the piston is connected to a guide rod for guiding the piston and for loading the spring-elastic tension elements. As a result, the guide rod that is connected with the piston ensures safe guiding of the piston. As the same time, the guide rod serves as the tension member for the tension springs by providing it with a tension lever. The complex structure and constructive length of the pulsating suction unit, which includes the length of the suction tube, the length of the cylinder, and the length of the handle with the tension lever, are disadvantages of this arrangement.

SUMMARY OF THE INVENTION

It is an object of the present invention to avoid these disadvantages of known devices for catching insects, spiders and other such small animals.

This object is attained by a pulsating suction unit having a cylindrical housing part, a piston, a suction tube and a spring-elastic element, wherein the spring-elastic element is formed by a compression spring arranged between the piston and the suction tube in the interior of the cylindrical housing par, wherein the suction tube which is operatively connected with the piston via the compression spring is movably guided in a feedthrough in the front wall of the cylindrical housing part so that the suction tube can be moved in the axial direction, and wherein the piston has, on its suction tube side, latching means that latch into a holding device having a locking mechanism for this purpose that is arranged in the bottom part of the suction tube, wherein the locking mechanism can be unlocked by a trigger that can be operated from the outside.

In the device in accordance with the invention, a spring-elastic element, e.g., a compression spring, is arranged in a hollow cylinder between the piston and the bottom part of the suction tube. The suction tube, which is operatively connected with the piston via the spring-elastic element, is movable in the axial direction and held movable in a feedthrough in the front wall of the cylinder. The piston has on the suction tube side latching means that are provided for latching into a pocket arranged for this purpose in the bottom part of the suction tube, and can be triggered via a trigger mechanism that can be operated from the outside. In order to operate the pulsating suction unit, i.e., in order to load the pulsating suction unit, the suction tube is inserted into the cylinder and pushed against the pressure force of the spring-elastic element in the direction of the cylinder bottom until the latching means of the piston latch onto the holding device in the bottom part of the suction tube. For triggering purposes, i.e., for catching an insect, the suction tube is pulled out of the cylinder and the piston that is connected with the suction tube via the spring-elastic element is moved in the direction of the front wall of the cylinder so that the trigger mechanism engages the latching means and unlocks the holding device by operating the trigger. On the one hand, due to the pressure force of the spring-elastic element, the suction tube is moved out of the cylinder even further until the bottom part of the suction tube contacts the inner side of the front wall of the cylinder, and, on the other hand, the piston is pushed in the direction of the cylinder bottom. As a result, negative pressure is generated in the cylinder space between the piston and the bottom part of the suction tube, whereby air is sucked in through the suction tube. This air stream sucks an insect that is located in front of the suction tube into the catch space arranged in the front area of the suction tube. On the one hand, with the device according to the invention, the suction tube still approaches the object to be caught when the catch process is triggered, which leads to increased catch reliability, and on the other hand, the overall constructive size of the device can be kept small since the suction tube can be moved into the cylinder when it is not used. It is another advantage that the pulsating suction unit can only be triggered if the suction tube is positioned in the device in such a way that the trigger device can be unlocked. This leads to increased safety in handling the pulsating suction unit.

BRIEF DESCRIPTION OF THE DRAWING

Further advantages of the invention result from the dependent patent claims and the description below, in which exemplary embodiments of the invention are explained in more detail with reference to the drawings.

It is shown in:

FIG. 4 a cross section through the longitudinal axis of the catch device with the tensed compression spring in a locked trigger position;

FIG. 5a a partial view of a cross section through the longitudinal axis of the catch device in the area of the holding device in a locked position;

FIG. 5b a cross section perpendicular to the longitudinal axis of the catch device in the area of the holding device in a locked position;

FIG. 6a a partial view of a cross section through the longitudinal axis of the catch device in the area of the holding device in an unlocked position;

FIG. 6b a cross section perpendicular to the catch device in the area of the holding device in an unlocked position;

DETAILED DESCRIPTION OF PREFERRED EMBODIMENTS

Figure 1:
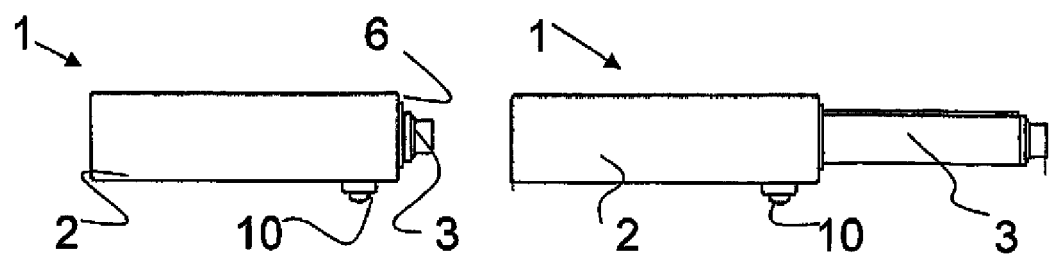
FIG. 1 the housing of the catch device wherein the suction tube is retracted and extended, respectively.

In the Figures, same elements are designated with same reference numerals and first-time explanations apply to all Figures, unless expressly mentioned otherwise.

FIG. 1 shows an exemplary embodiment of a catch device in accordance with the invention having a cylindrical housing part 2 and a suction tube 3. The suction tube 3 is movable in the axial direction and movably guided in a feedthrough in the front wall 6 of the cylindrical housing part 2. In the left-hand part of FIG. 1, the suction tube 3 is located in the housing part 2. The right-hand part shows the catch device 1 with the suction tube 3 completely pulled out.

Figure 2:
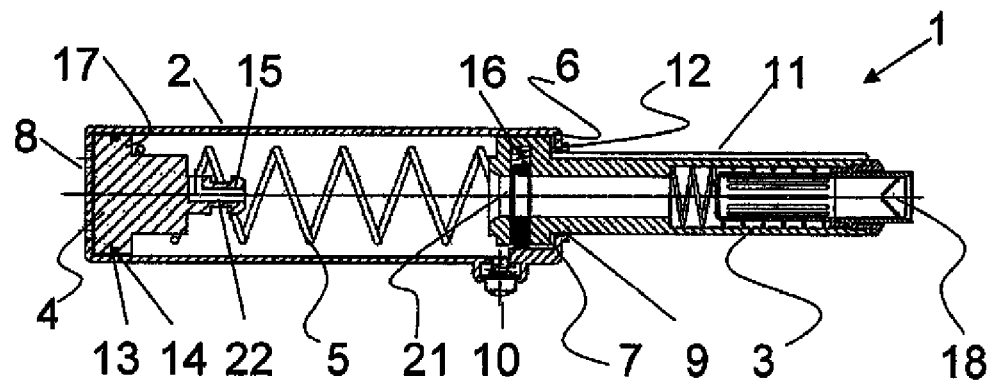
FIG. 2 a cross section through the longitudinal axis of the catch device with a relaxed compression spring.

FIG. 2 shows a cross section through the longitudinal axis of the catch device 1. A piston 4 is arranged in the housing part 2. The piston 4 is operatively connected with the bottom 7 of the suction tube 3 via a spring-elastic element, e.g., a compression spring 5. The relaxed spring 5 pushes the piston 4 and the suction tube 3 apart so that the piston 4 bears upon the rear housing wall 8 and the bottom 7 of the suction tube 3 bears upon the front housing wall 6. The suction tube 3 is guided in the feedthrough 9 of the front housing wall 6. The bottom 7 of the suction tube 3 has an inner diameter that approximately corresponds to the inner diameter of the housing 2 so that the suction tube 3 is movable in the axial direction without tilting. A bar 11 extends in the longitudinal direction and is arranged on the upper side of the suction tube 3 for engagement in a recess 12 in the feedthrough 9 of the front housing wall 6. As a result, the suction tube 3 is constraint against rotation, i.e., the suction tube 3 can only be moved in the direction of the longitudinal axis but cannot be rotated with respect to the longitudinal axis of the device. The plunger-like piston 4 has a diameter that substantially corresponds to the inner diameter of the cylindrical piston housing 2. A sealing 13 is inserted into a ring groove 14 in the piston 4 to contact the inner wall of the piston housing 2 in a sealing manner. The piston 4 is step-shaped on the suction tube side and terminates in a nipple 15 that forms latching means for latching into a holding device having a locking mechanism 16 provided for this purpose in the bottom part 7 of the suction tube 3. The holding device is formed by a slider 26 which is spring-loaded and guided in a slot 25 that extends perpendicular to the longitudinal axis. The slider 26 has a hole for receiving the nipple 15 and latches into the groove 22 of the nipple 15. The first step in the piston 4 forms a shoulder 17 to receive the compression spring 5. A removable catch container 18 for receiving the insects to be caught is arranged at the mouth of the suction tube 3. A trigger embodied as a push button 10 can be seen in the front end area of the housing 2. In the illustrated position, which shows the state after a catch process has been completed, the suction tube is pulled out to a maximum and the piston 4 is located at the rear end of the piston housing 2.

Figure 3:
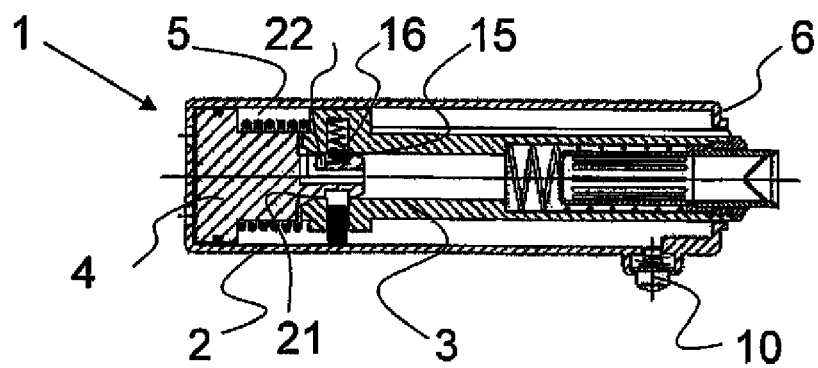
FIG. 3 a cross section through the longitudinal axis of the catch device with a tensed compression spring in a secured position.

FIG. 3 shows a cross section through the longitudinal axis of the catch device 1 with the compression spring 5 being loaded. In order to load the compression spring 5, the suction tube 3 is pushed into the housing 2 against the spring force of the compression spring 5. As soon as the compression spring 5 is sufficiently squeezed together and the nipple 15 is located in the opening 21 on the piston side of the suction tube 3, the locking mechanism 16 arranged in the holding device snaps into a ring groove 22 in the nipple 15. As a result, the piston 4 that is maintained under tension by the compression spring 5 is held together with the suction tube 3. The suction tube 3 is almost entirely in the housing 2. Only the forwardmost part of the suction tube 3 protrudes from the front cylinder wall 6. Since, in this position, the locking mechanism 16 is not accessible from the outside, it cannot be triggered. The catch device 1 is tensed but still secured. When the suction tube 3 is axially pulled out of the housing 2, the locked piston 4 that is connected with the suction tube 3 via the holding device 16 also moves in the direction of the front cylinder wall 6. The catch process can then be triggered when the piston 4 with the bottom 7 of the suction tube 3 is positioned in the housing 2 in such a way that the locking mechanism 16 can be operated by the trigger. For this purpose, a stop 34 is provided at the inner side of the housing wall in the area of the trigger 10. The slider 26 contacts the stop 34 as soon as the suction tube 3 is completely pulled out. By pressing the trigger 10, the holding device is unlocked and the catch process is triggered.

FIG. 4 shows a cross section through the longitudinal axis of the catch device with the compression spring being tensed and in the locked trigger position. The trigger 10 and/or the stop 34 are arranged at the housing 2 in such a way that the bottom 7 of the suction tube 3 does not yet touch the front cylinder wall 6 in this position. When the trigger 10 is pushed for a catch process, the locking mechanism 16 is unlocked and, on the one hand, the suction tube 3 leaps forward until the bottom 7 of the suction tube 3 contacts the front cylinder wall 6 inside, and, on the other hand, the piston 4 leaps in the direction of the rear housing wall 8. As the piston 4 jumps back, negative pressure is generated in a pulse-like manner in the interior of the housing 2 between the piston 4 and the bottom 7 of the suction tube 3. The negative pressure effectuates the suction effect in the suction tube 3 and sucks an insect located in front of the suction tube 3 into the catch container 18. The air cushion between the piston 4 and the rear housing wall 8 can escape through the openings 30 in the rear housing wall 8, when the piston 4 jumps back. As the suction tube 3 is further moved slightly forward in the direction of the object to be caught, when the catch process is triggered, the catch rate increases as compared to a rigid suction tube and the insect has almost no opportunity to escape the suction of the catch device. A filter 23 made of thin wires and resembling a fish trap is arranged at the mouth of the catch container 18. The wires are directed inwards in a funnel-like manner and towards the longitudinal axis to form a kind of barbed hook so that a sucked-in insect cannot escape from the catch container. A screen 24 is provided at the housing side end of the catch container 18 so that the insect is not sucked into the housing. The catch container 18 arranged in the front area of the suction tube 3 has an absorption spring 31 for shock absorption. In other words, the catch container 18 can be pushed into the suction tube 3 in opposition to the spring force of the absorption spring 31. When relaxed again in the axial direction, the catch container 18 is pushed back to its original position by the absorption spring. It is the objective of the shock absorption to absorb a shock by the suction tube 3 onto a body or object when the catch device 1 with the suction tube 3 was placed too close to a fixed object as the catch process was triggered. In this way, injuries to persons or damage to objects can be avoided.

FIG. 5a shows a partial view of a cross section through the longitudinal axis of the catch device 1 in the area of the holding device and/or the trigger 10 in the locked position. The nipple 15 is located in the opening 21 on the piston side of the suction tube 3. The edge of the opening 21 has a funnel-like slant. The nipple 15 is slanted at its front end in the shape of a truncated cone. In this way, the nipple 15 is automatically centered in the opening 21 of the suction tube 3, when the nipple 15 is inserted into the opening 21. The bottom 7 of the suction tube 3 has a slot 25 which extends perpendicular to the longitudinal axis and into which a slider 26 is inserted.

FIG. 5b shows a cross section perpendicular to the longitudinal axis of the catch device in the area of the holding device in the locked position. The details of the holding device can be seen. A blind hole 32 is provided in the bottom of the slot 25, into which a compression spring 27 is inserted. This spring 27 pushes the slider against the inner wall of the housing 2. The hole 33 in the slider 26 is off-center with respect to the longitudinal axis of the piston 4 and the suction tube. When the suction tube 3 is pushed against the piston 4 and the nipple 15 is pushed into the piston side opening 21 in the bottom 7 of the suction tube 3, the front end of the nipple 22 moves the slider 26 laterally until the nipple 15 is inserted into the suction tube 3 far enough and the spring-loaded slider 26 snaps in place in the groove 22. Thus, the piston 4 which is maintained under tension by the compression spring 5 is held with the suction tube 3 in the holding device and locked.

FIGS. 6a and 6b show the same partial views as FIGS. 5a and 5b with the difference residing in that the push button 10 which is spring-loaded by the spring 35 is pushed, so that the pin 29 moves the slider 26 out of the groove 22 in the nipple 15 in opposition to the spring force of the spring 27. As a result, the holding device 16 is unlocked and the piston 4 is no longer held together with the suction tube 3. The tension force of the compression spring 5 causes a movement of the suction tube 3 and the piston 4 in opposite directions. The nipple 15 is further formed with a longitudinal bore and a cross bore connected therewith to form an air channel 36. The air channel 36 connects the suction tube 3 with the interior of the piston housing 2 and permits that during the catch process air can already be drawn out of the sucking pipe 3 immediately after the triggering action, even though the nipple 15 still covers part of the opening 21.

Figure 7:
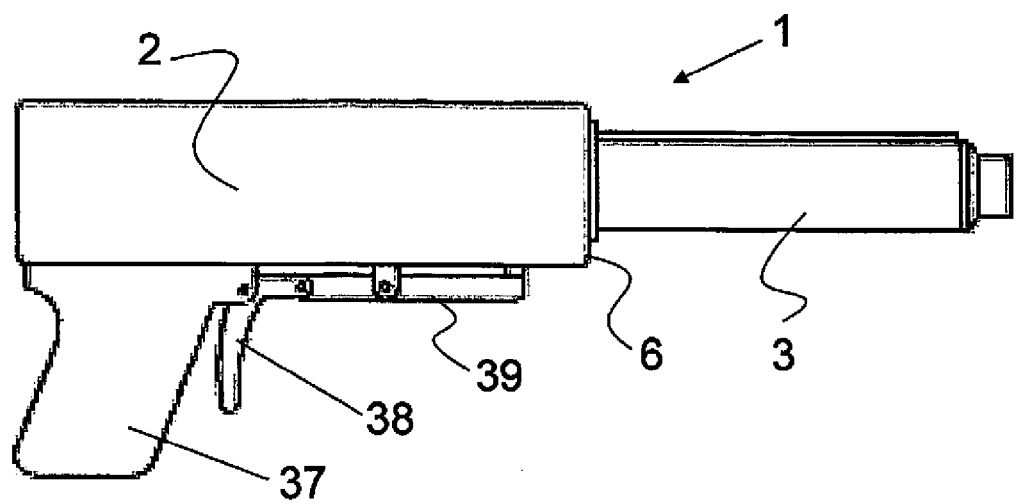
FIG. 7 the catch device having a pistol-like handle with a trigger lever arranged at the housing.

FIG. 7 shows another embodiment of the catch device 1 in accordance with the invention. A pistol-like handle 37 with a trigger lever 38 is arranged at the housing 2 of the catch device 1. By pulling the trigger lever, the trigger 10 is operated via a tilt lever 39.

Figure 8:
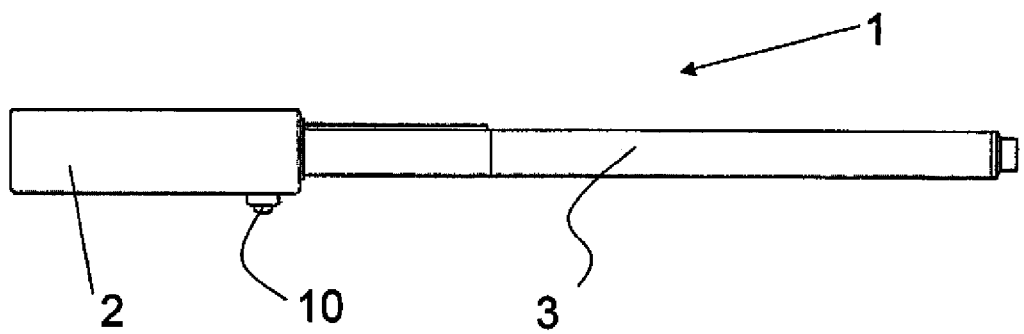
FIG. 8 an embodiment of the catch device having a suction tube in the form of a telescope tube.

FIG. 8 shows a suitable improvement of the invention by configuring the suction tube 3 in the form of a telescope tube 40. With the aid of a device equipped with such a telescope tube 40, spaces within a room can be reached that are normally not accessible without auxiliary means, such as corners between the ceiling and the walls of inhabited rooms.

Thus, in comparison to known devices, the device in accordance with the invention is significantly simpler and smaller in its structure and overall safe in its application and operation.

What is claimed is:

1. A pulsating suction device for catching insects, spiders and other small animals, comprising:
   a cylindrical housing having an interior and defining a longitudinal axis, said housing having a front wall with a feedthrough and a closed rear wall;
   a suction tube having a piston-proximal end and a suction end guided in the feedthrough for movement in an axial direction;
   a piston arranged for movement in the axial direction inside the housing and relative to the suction tube and having a suction-tube-proximal end formed with a latching member;
   a spring-elastic element extending between the piston and the suction tube in the interior of the housing, wherein a first end of the spring-elastic element is attached to the piston and a second end of the spring-elastic element is attached to the suction tube to thereby operatively connect the piston with the suction tube;
   a holding unit arranged in the piston-proximal end of the suction tube and including a locking member for releasably locking with the latching member, when the suction tube is moved in the axial direction against the piston; and
   a trigger arranged proximate the front wall of the housing and actuated from outside to release the latching member of the piston from the locking member of the suction tube to thereby cause a spring force from the spring-elastic element to move the piston away from the suction tube toward the closed rear wall of the housing and produce a reduced pressure inside the housing, drawing in insects, spiders and other small animals.

2. The pulsating suction device of claim 1, wherein the spring-elastic element is a compression spring.

3. The pulsating suction device of claim 1, wherein the latching member is a nipple extending from the piston in a direction of the suction tube and formed with a ring groove for receiving the locking member.

4. The pulsating suction device of claim 3, wherein the holding unit includes a compression spring, and a slider which is urged by the compression spring against an inner wall of the housing and guided in a slot which is provided in the bottom of the suction tube and extends in perpendicular relationship to the longitudinal axis; said spring-loaded slider having a hole for receiving the nipple; said compression spring being received in a blind hole formed in a bottom of the slot.

5. The pulsating suction device of claim 3, wherein the nipple has an axial longitude bore which terminates in a cross bore extending perpendicular to the longitude bore so that the longitudinal bore and the cross bore define an air channel.

6. The pulsating suction device of claim 1, further comprising a bar extending on an upper side of the suction tube in a direction of the longitudinal axis and engaging a recess in the feedthrough in the front wall of the housing.

7. The pulsating suction device of claim 1, wherein the suction tube has a mouth at a front end which is distal to the holding unit, and further comprising a removable catch container having filter device and arranged at the mouth of the suction tube.

8. The pulsating suction device of claim 7, further comprising an absorption spring for shock absorption of the catch container in the direction of the longitudinal axis.

9. The pulsating suction device of claim 1, wherein the housing has a pistol-grip-shaped handle provided with a trigger lever and a tilt lever for operating the trigger.

10. The pulsating suction device of claim 1, wherein the suction tube is constructed in the form of a telescope tube.

11. The pulsating suction device of claim 1, wherein the trigger is positioned at the housing such that the bottom of the suction tube is moved in a direction towards the front wall of the housing, when a catch process in triggered.

* * * * *